US009866054B2

(12) United States Patent
Lee

(10) Patent No.: US 9,866,054 B2
(45) Date of Patent: Jan. 9, 2018

(54) CHARGING CONTROLLING DEVICE

(71) Applicant: LSIS CO., LTD., Anyang-si, Gyeonggi-do (KR)

(72) Inventor: Seong Joon Lee, Gunpo-si (KR)

(73) Assignee: LSIS Co., LTD., Anyang-Si, Gyeonggi-Do (KR)

( * ) Notice: Subject to any disclaimer, the term of this patent is extended or adjusted under 35 U.S.C. 154(b) by 250 days.

(21) Appl. No.: 14/885,939

(22) Filed: Oct. 16, 2015

(65) Prior Publication Data

US 2016/0233709 A1 Aug. 11, 2016

(30) Foreign Application Priority Data

Feb. 11, 2015 (KR) ........................ 10-2015-0021090

(51) Int. Cl.

| | |
|---|---|
| ***H02J 7/00*** | (2006.01) |
| ***H02J 7/14*** | (2006.01) |
| ***H02J 3/32*** | (2006.01) |
| ***H02J 3/38*** | (2006.01) |
| *H02J 7/35* | (2006.01) |

(52) U.S. Cl.

CPC ................ *H02J 7/007* (2013.01); *H02J 3/32* (2013.01); *H02J 3/383* (2013.01); *H02J 7/0026* (2013.01); *H02J 7/0013* (2013.01); *H02J 7/35* (2013.01); *Y02E 10/563* (2013.01); *Y02E 10/566* (2013.01); *Y02E 70/30* (2013.01)

(58) Field of Classification Search

USPC ....... 320/109, 116, 107, 132, 134, 108, 126, 320/103, 110, 118, 162; 307/104, 149; 429/50, 61

See application file for complete search history.

(56) References Cited

U.S. PATENT DOCUMENTS

| | | | | |
|---|---|---|---|---|
| 9,608,472 | B2 * | 3/2017 | Moshfeghi | H02J 7/025 |
| 2004/0047298 | A1 * | 3/2004 | Yook | H04L 29/12254 370/254 |
| 2009/0146610 | A1 | 6/2009 | Trigiani | |
| 2011/0025270 | A1 * | 2/2011 | Nakanishi | B60L 11/1851 320/116 |

(Continued)

FOREIGN PATENT DOCUMENTS

| | | |
|---|---|---|
| CN | 102549871 | 7/2012 |
| CN | 102893482 | 1/2013 |

(Continued)

OTHER PUBLICATIONS

Japan Patent Office Application No. 2015-220169, Office Action dated Nov. 29, 2016, 2 pages.

(Continued)

*Primary Examiner* — Alexis Pacheco

(74) *Attorney, Agent, or Firm* — K&L Gates LLP

(57) ABSTRACT

An charging control device includes: one or more slave groups including a plurality of slaves for charging or discharging a battery; and a master configured to transmit, to the one or more slave groups, a control signal for controlling operations of the one or more slave groups, and select one of a plurality of slaves included in each of the one or more slave groups as an alternative master, wherein the alternative master is a slave capable of performing some or all of all functions of the master.

8 Claims, 9 Drawing Sheets

100
101 GENERATION DEVICE
DC
103 INVERTER
AC
105 AC FILTER
107 AC/AC CONVERTER
Power Surplus
Power Shortage
109 SYSTEM
111 CHARGING CONTROL DEVICE
CHARGING
DISCHARGING
113 BATTERY ENERGY STORAGE SYSTEM
115 SYSTEM CONTROL UNIT
117 LOAD

(56) References Cited

U.S. PATENT DOCUMENTS

| | | | | |
|---|---|---|---|---|
| 2011/0080138 | A1* | 4/2011 | Nakanishi | H02J 7/0016 320/116 |
| 2012/0212183 | A1* | 8/2012 | Yamada | H02J 3/32 320/126 |
| 2012/0295139 | A1* | 11/2012 | Jeong | H01M 10/48 429/50 |
| 2014/0077768 | A1 | 3/2014 | Jung | |
| 2014/0079960 | A1 | 3/2014 | Yun | |
| 2014/0152100 | A1 | 6/2014 | Lim | |
| 2014/0225565 | A1* | 8/2014 | Eger | B60L 11/1844 320/109 |
| 2014/0315048 | A1* | 10/2014 | Yang | H01M 10/4207 429/50 |
| 2014/0375206 | A1* | 12/2014 | Holland | H02J 9/061 315/86 |

FOREIGN PATENT DOCUMENTS

| | | |
|---|---|---|
| CN | 104242375 | 12/2014 |
| JP | 2000294298 | 10/2000 |
| JP | 2003009403 | 1/2003 |
| JP | 2003309887 | 10/2003 |
| JP | 2007252175 | 9/2007 |
| JP | 2011067047 | 3/2011 |
| JP | 2012050158 | 3/2012 |
| JP | 2013162635 | 8/2013 |
| JP | 2013246548 | 12/2013 |
| JP | 2013247855 | 12/2013 |
| JP | 2014143771 | 8/2014 |
| JP | 2015507451 | 3/2015 |
| KR | 10-2012-0063492 | 6/2012 |
| KR | 10-2013-0060215 | 6/2013 |
| KR | 2013-0085203 | 7/2013 |
| KR | 10-2014-0049287 | 4/2014 |
| KR | 10-2014-0072692 | 6/2014 |
| KR | 10-2014-0086499 | 7/2014 |

OTHER PUBLICATIONS

Korean Intellectual Property Office Application Serial No. 10-2015-0021090, Office Action dated Jan. 20, 2016, 7 pages.

Japan Patent Office Application No. 2015-220169, Office Action dated Apr. 11, 2017, 3 pages.

Japan Patent Office Application No. 2015-220169, Office Action dated Jul. 18, 2017, 3 pages.

The State Intellectual Property Office of the People's Republic of China Application Serial No. 201610060146.4, Office Action dated Nov. 3, 2017, 8 pages.

* cited by examiner

111

CHARGING CONTROLLING DEVICE

CROSS-REFERENCE TO RELATED APPLICATIONS

Pursuant to 35 U.S.C. §119(a), this application claims the benefit of earlier filing date and right of priority to Korean Patent Application No. 10-2015-0021090, filed on Feb. 11, 2015, the contents of which are all hereby incorporated by reference herein in its entirety.

BACKGROUND

The present disclosure relates to a charging control device, and particularly, to a charging control device for efficiently performing the energy management of an energy storage system.

Since electrical energy is easily transferred and converted, it is widely used. Thus, various power generation systems are used to produce electrical energy. Especially, due to concerns about depletion of fossil energy such as petroleum and environmental pollution, there is an increasing interest in alternative energy. Therefore, there are growing interests in solar power and wind power. Solar power generation is to expand panels having solar cells attached on a large scale, thereby mass-producing electricity by using solar energy. Since solar power generation and wind power generation use unlimited and pollution-free solar energy, no cost of fuel is required and there are no air pollution and waste generation.

A generation system includes a stand-alone system and a grid-connected system. The stand-alone system is to supply a generated electrical energy to an independent load. The grid-connected system connects a generation device to an existing power grid and uses it. In the case of an overloading grid, if electricity is generated from a generation system, the grid-connected system transmits the electricity and in the case of a light loading grid, receives electricity from the grid. In order to efficiently use a grid-connected generation system, a solar power generation system is introduced to store idle power in a Battery Energy Storage System (BESS) in the case of light loading, and supply power to a grid by discharging generation power and the BESS in the case of overloading.

SUMMARY

Embodiments provide a charging control device for efficiently performing management by selecting some of a plurality of slaves as an alternative master for performing a master function.

In one embodiment, a charging control device includes: one or more slave groups including a plurality of slaves for charging or discharging a battery; and a master configured to transmit, to the one or more slave groups, a control signal for controlling operations of the one or more slave groups, and select one of a plurality of slaves included in each of the one or more slave groups as an alternative master, wherein the alternative master is a slave capable of performing some or all of all functions of the master.

When the alternative master performs some functions of the master, the some functions may include a function for detecting whether an overload occurs.

When one alternative master among a plurality of alternative masters detects an overload of a slave included in another slave group, the alternative master detecting the overload may transmit information on the overload occurring salve to another alternative master or the master.

The charging control device may further include a plurality of switch pairs for connecting or separating between the plurality of slaves, wherein the master may control operations of the plurality of switch pairs to bypass an overload occurring slave on the basis of received information.

The bypassing processing may be a process for controlling operations of the plurality of switch pairs to deliver the control signal between the remaining slaves except for the error occurring slave.

The master may transmit a control signal to check an error occurring slave among the plurality of slaves and the alternative master may check an error occurring slave on the basis of a response signal corresponding to the control signal.

The response signal may include a data frame including response data representing state information of each of a plurality of slaves.

The state information may include at least one of values of current and voltage flowing in each slave.

When a value of a current flowing in a slave is greater than a predetermined value, the alternative master may determine this as that an overload is applied to a corresponding slave.

The plurality of slaves and the master may be connected in series to each other to have a ring structure.

The details of one or more embodiments are set forth in the accompanying drawings and the description below. Other features will be apparent from the description and drawings, and from the claims.

DETAILED DESCRIPTION OF THE EMBODIMENTS

Figure 1:
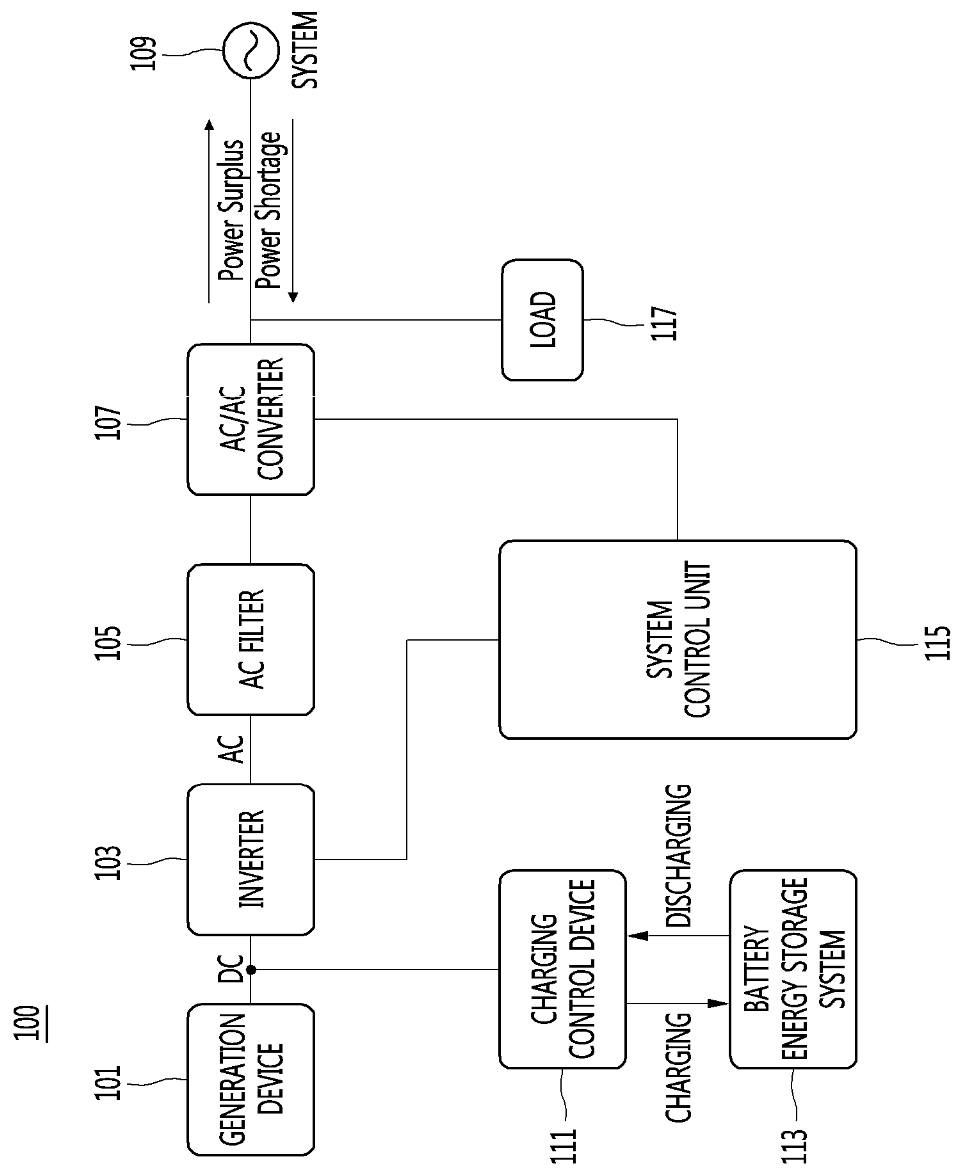
FIG. 1 is a block diagram illustrating a generation system according to an embodiment of the present invention.

Reference will now be made in detail to the embodiments of the present disclosure, examples of which are illustrated in the accompanying drawings.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

Hereinafter, a generation system according to an embodiment of the present invention is described with reference to FIG. 1.

FIG. 1 is a block diagram illustrating a generation system according to an embodiment of the present invention.

A generation system 100 according to an embodiment of the present invention includes a generation device 101, an inverter 103, an alternating current (AC) filter 105, an AC/AC converter 107, system 109, a charging control device 111, a battery energy storage system 113, a system control unit 115, and a load 117

The generation device 101 generates electrical energy. When the generation system is a solar power generation system, the generation device 101 may be a solar cell array. The solar cell array combines a plurality of solar cell modules. The solar cell module is a device for generating a predetermined voltage and current by converting solar energy into electrical energy as connecting a plurality of solar cells in series or parallel. Accordingly, the solar cell array absorbs solar energy and converts it into electrical energy. Additionally, when the generation system is a wind power generation system, the generation device 101 may be a fan for converting wind power energy into electrical energy.

The inverter 103 inverts DC power into AC power. The inverter 103 receives DC power supplied by the generation device 101 or DC power discharged from the battery energy storage system 113 through the charging control device 111, and inverts it into AC power.

The AC filter 105 filters the noise of a power inverted into AC power.

The AC/AC converter 107 converts the voltage size of an AC power where noise is filtered and supplies power to the system 109 or an independent load, in order to supply AC power to the system 109 or the load 117.

The system 109 is a system where many power plants, substations, transmission and distribution lines, and loads are integrated to generate and use power.

The load 117 consumes power by receiving electrical energy from a generation system.

The charging control device 111 may control the charging and discharging of the battery energy storage system 113. When the system 109 or the load 117 is overloaded, the charging control device 111 receives power from the battery energy storage system 113 and delivers the power to the system 109 or the load 117. When the system 109 or the load 117 is lightly loaded, the charging control device 111 receives power from the generation device 101 and delivers the power to the battery energy storage system 113.

The battery energy storage system 113 receives electronic energy from the generation device 101 and performs charging, or discharge the charged electrical energy according to a power supply situation of the system 109 or the load 117. In more detail, when the system 109 or the load 117 is lightly loaded, the battery energy storage system 113 receives idle power from the generation device 101 and performs charging. When the system 109 or the load 117 is overloaded, the battery energy storage system 113 discharges the charged power to supply the power to the system 109 or the load 117. A power supply situation of the system 109 or the load 117 may have a great difference for each time. Accordingly, it is inefficient for the generation system 100 to supply power from the generation device 101 uniformly without consideration on a power supply situation of the system 109 or the load 117. Therefore, the generation system 100 adjusts the amount of power supply according to a power supply situation of the system 109 or the load 117 by using the battery energy storage system 113. Through this, the generation system 100 may efficiently supply power to the system 109 or the load 117.

The battery energy storage system 113 may include a plurality of batteries.

The system control unit 115 controls operation of the inverter 103 and the AC/AC converter 107.

Figure 2:
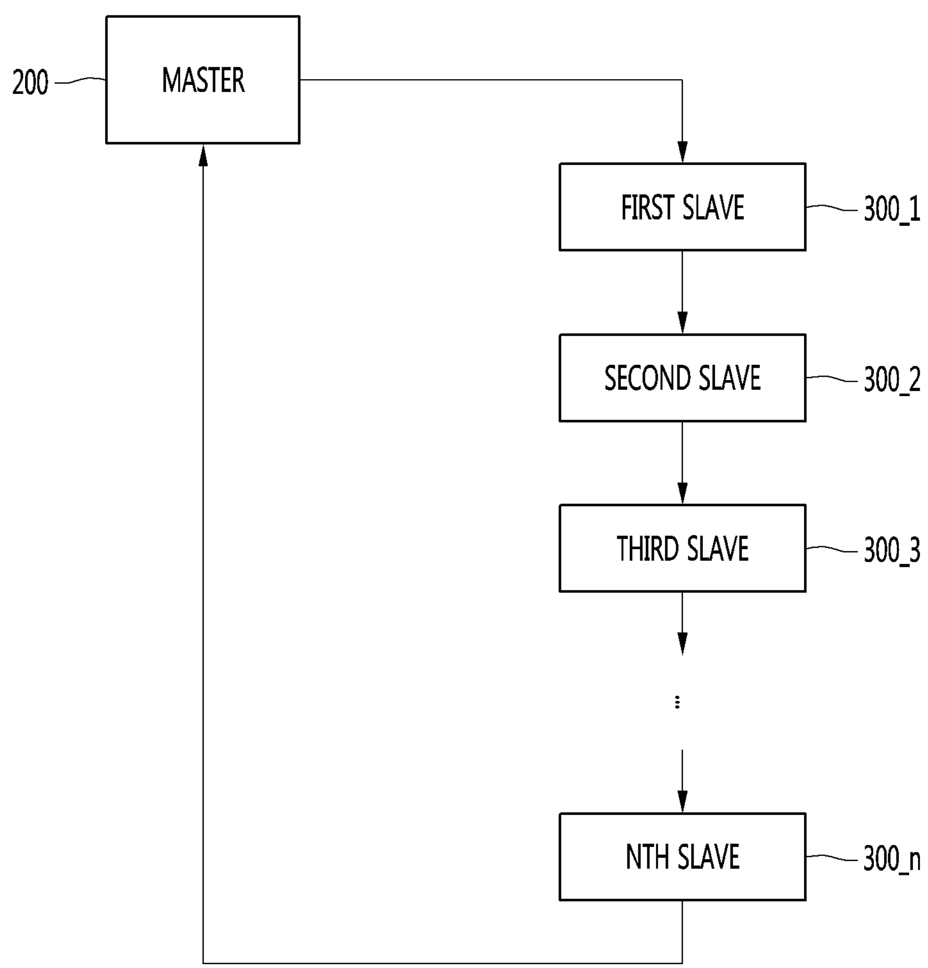
FIG. 2 is a block diagram illustrating a configuration of a charging control device according to an embodiment of the present disclosure.
Figure 3:
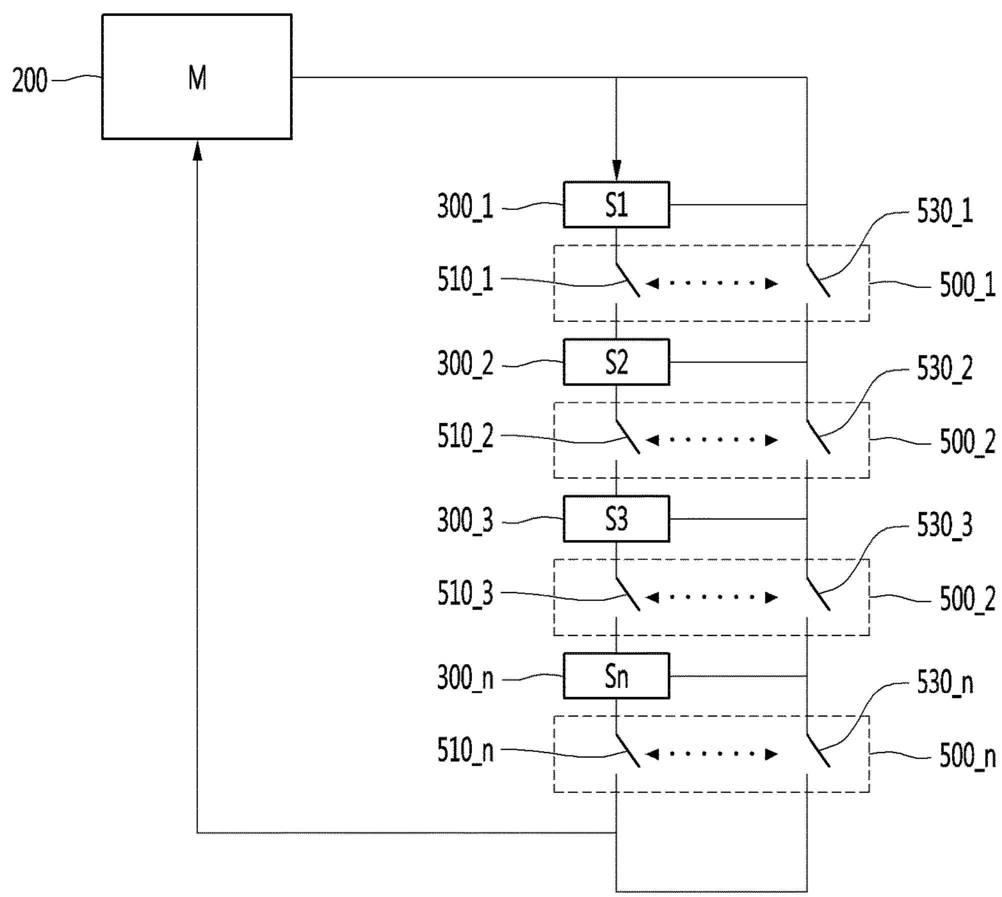
FIG. 3 is a view illustrating an operation method of a charging control device according to an embodiment of the present invention.

Then, FIGS. 2 to 3 are described.

FIG. 2 is a block diagram illustrating a configuration of a charging control device according to an embodiment of the present invention and FIG. 3 is a view illustrating a specific operation of a charging control device according to an embodiment of the present invention.

Referring to FIG. 2, the charging control device 111 includes a master 200 and a plurality of slaves 300_1 to **300_*n***.

The charging control device 111 may form a ring structure. The ring structure may represent a structure in which the master 200 and the plurality of slaves 300_1 to **300_*n* are connected in series through a communication line. When the charging control device 111 forms a ring structure, since the master 200 and the plurality of slaves 300_1 to 300_*n* are connected in series to each other, the length of a communication wire may be reduced and operational stability may be enhanced. That is, according to a conventional parallel structure, each two transmission/reception lines are required between a master and a slave and when n slaves are connected to one master, 2n communication lines are required. However, the charging control device 111 of a ring structure is sufficient if there are n+1 communication lines for one master 200** and n slaves.

A communication line may be configured using a fiber optic but this is just exemplary.

The master 200 may control operations of the plurality of slaves 300_1 to **300_*n*. The master 200 may generate a control signal for controlling operations of the plurality of slaves 300_1 to 300_*n* and transmit the control signal to the plurality of slaves 300_1 to 300_*n*. The master 200 may transmit, to the plurality of slaves 300_1 to 300_*n***, a charging control signal for requesting the charging of a battery or a discharging control signal for requesting the discharging of a battery.

The master 200 may transmit a test control signal to the plurality of slaves 300_1 to **300_*n*, and receive a response signal corresponding thereto. The master 200 may check whether an error occurs in at least one of the plurality of slaves 300_1 to 300_*n*** on the basis of the received signal.

Each of the plurality of slaves 300_1 to **300_*n* may charge or discharge a plurality of batteries included in the battery energy storage system 113 according to a control signal received from the master 200. The plurality of slaves 300_1 to 300_*n*** may correspond to a plurality of batteries and each slave may control the charging or discharging of a corresponding battery.

Referring to FIG. 3, the charging control device 111 may further include a plurality of switching pairs 500_1 to **500_*n***.

The master 200 may bypass a slave where an error occurs by controlling operations of the plurality of switching pairs 500_1 to 500_*n*. The bypass processing may operate the remaining slaves except for a slave where an error occurs by adjusting a transmission path of a control signal transmitted from the master 200.

Each switch pair may connect or disconnect between slaves.

Each switch pair may include two switches. One of two switches is a switch for directly connecting or disconnecting between slaves and the other one is a switch for changing a transmission path of a control signal.

Then, an operation method of a charging control device according to an embodiment of the present invention will be described with reference to FIG. 4.

Figure 4:
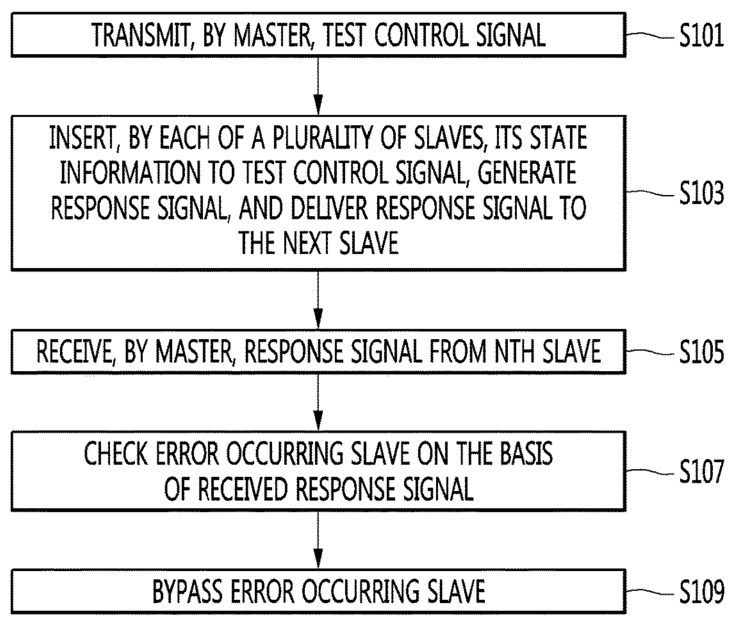
FIG. 4 is a flowchart illustrating an operation method of a charging control device according to an embodiment of the present invention.

FIG. 4 is a flowchart illustrating an operation method of a charging control device according to an embodiment of the present invention.

First, the master 200 may transmit a test control signal to the first slave 300_1 in order to check whether each of the plurality of slaves 300_1 to 300_*n* performs a normal operation in operation S101.

According to an embodiment of the present invention, a test control signal may be a control signal for checking whether an error occurs in each of the plurality of slaves 300_1 to 300_*n*. The test control signal may be a signal for checking whether a battery managed by each slave is in charge or in discharge. The test control signal may be one of a charging control signal for controlling the charging of a battery through each slave and a discharging control signal for controlling the charging of a battery through each slave. An error occurring in a slave may be a short circuit or a malfunction of a slave.

Figure 5:
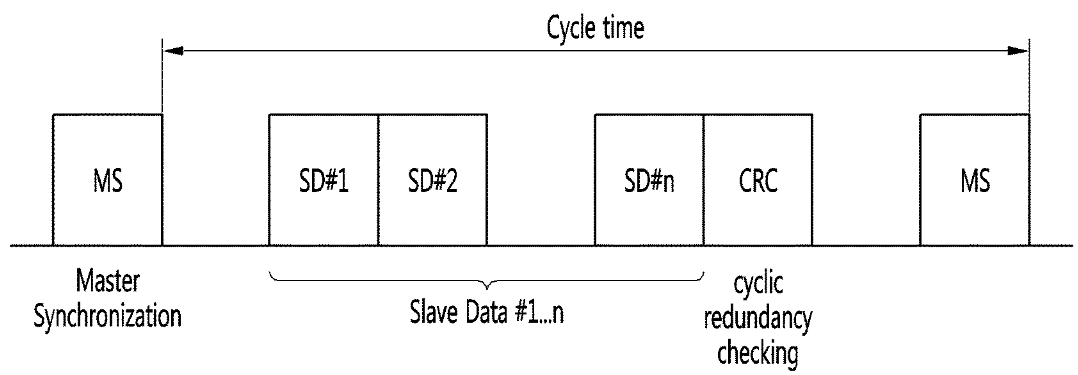
FIG. 5 is a view illustrating a data frame structure of a test control signal according to an embodiment of the present invention.

According to an embodiment of the present invention, the master 200 may transmit a test control signal to the plurality of slaves 300_1 to 300_*n* by using a time synchronization method in order to synchronize the plurality of slaves 300_1 to 300_*n*. If an interval between time slots (for example, a time corresponding to one bit) between devices for performing communication is different, the time synchronization method may be a data transmission method for guaranteeing the consistency of a timing that occurs when they exchange signals. The master 200 may transmit a test control signal including a data frame to a slave as shown in FIG. 5 below. This will be described with reference to FIG. 5.

FIG. 5 is a view illustrating a data frame structure of a test control signal according to an embodiment of the present invention.

The data frame shown in FIG. 5 may include Master Synchronization (MS) data, a plurality of slave data Slave Data #1 to Slave Data #n, and Cyclic Redundancy Checking (CRC) data in one period.

The MS data may be data representing that the master 200 synchronizes a control signal.

Each of the plurality of slave data Slave Data #1 to Slave Data #n may be data for controlling operations of each slave. Each slave data may include an instruction performed by a slave. The instruction may be a command for charging or discharging a battery.

The CRC data may be data for checking there is an error in data transmitted through a communication line.

According to another embodiment of the present invention, a data frame may not include CRC data. In this case, each slave may generate a response signal by inserting response data into corresponding slave data and the master 200 may check an error of a specific slave on the basis of the response signal. This will be described later.

Although a test control signal is assumed and described with reference to FIG. 5, a control signal having a data frame in FIG. 5 may be transmitted to a slave in order for controlling general operations of a slave instead of checking an error of a slave.

Again, FIG. 4 is described.

Each of the plurality of slaves 300_1 to 300_*n* generates a response signal by inserting its state information into a delivered test control signal and delivers the generated response signal to the next slave in operation S103.

That is, the first slave 300_1 may generate a response signal by inserting response data representing state information of the first slave 300_1 into a test control signal received from the master 200. The second slave 300_2 may generate a response signal by inserting response data representing state information of the second slave 300_2 into a response signal received from the first slave 300_1. By repeating this process, the nth slave 300_*n* may generate a response signal by inserting response data representing state information of the nth slave 300_*n* and then, deliver the response signal to the master 300. That is, in the data frame structure shown in FIG. 5, each slave may generate a response signal by including response data representing its state information in each slave. In this case, a data frame may not include CRC data.

State information of a slave may be information on an operation control of a battery performed by a slave. For example, state information of a slave may include a performance result on whether an instruction corresponding to a control signal of the master 200 is executed. That is, state information of a slave may include a performance result on whether an instruction corresponding to a control signal of the master 200 is executed.

The master 200 receives a response signal including state information of each of the plurality of slaves 300_1 to 300_*n* from the nth slave 300_*n* in operation S105 and the master 200 checks a slave having an error among the plurality of slaves 300_1 to 300_*n* on the basis of the received response signal in operation S107.

The master 200 may check a slave having an error through a data frame included in the received response signal. For example, when information represented by one of a plurality of slave data included in a data frame is different from predetermined information, it is checked that an error occurs in a corresponding slave. In more detail, when the master 200 requests the charging of a battery from the nth slave 300_*n* but information represented by response data inserted by the nth slave 300*n* represents that the charging of the battery is not performed, the master 200 may confirm that an error occurs in the nth slave 300_*n*.

The master 200 may bypass a slave having a checked error in operation S109.

According to an embodiment, the bypass processing may means allowing the remaining normally operating slaves to perform its function except for a slave having a checked error. For this, as shown in FIG. 3, the charging control device 111 may include the plurality of switching pairs 500_1 to 500_*n*. Each of the plurality of switching pairs 500_1 to 500_*n* may include two switches. The master 200 may control a plurality of switching pairs so that except for a slave having a checked error, the remaining slaves operate normally. 이에 대해서는 도 6 을 참조하여 설명한다 .

Figure 6:
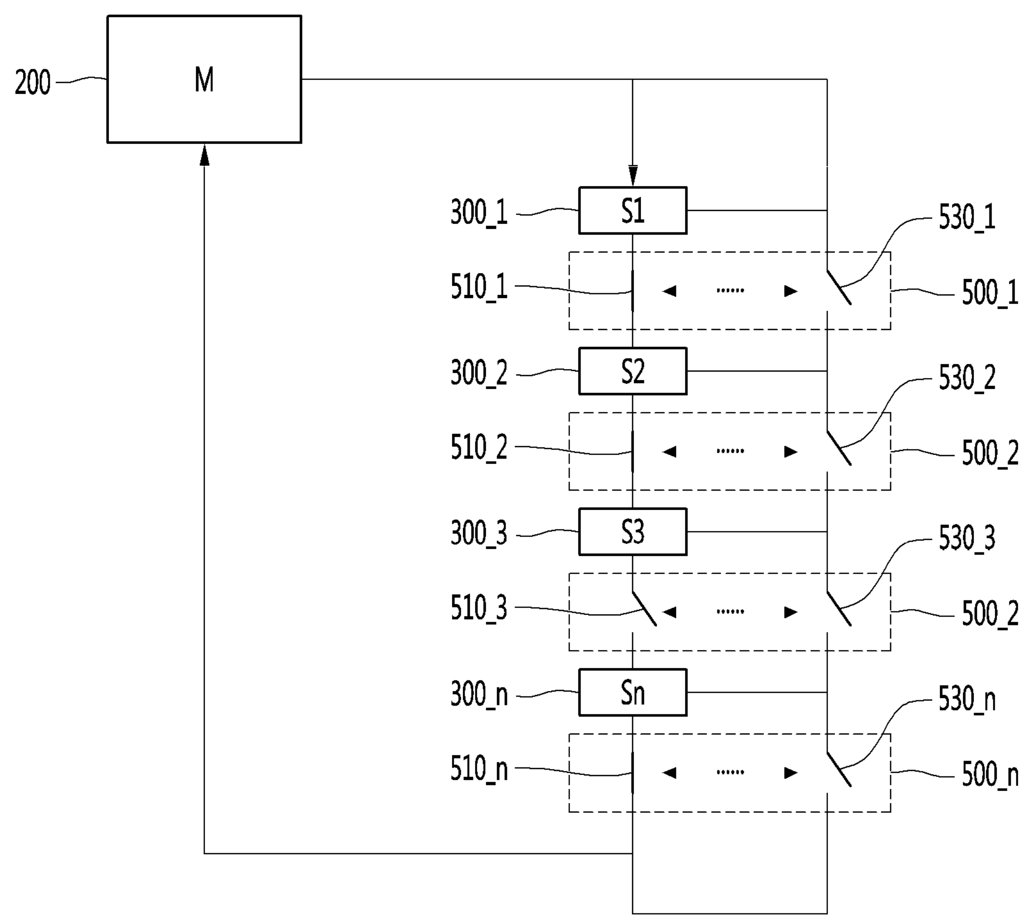
FIG. 6 is a view illustrating a process of bypassing an error checked slave according to an embodiment of the present disclosure.

FIG. 6 is a view illustrating a process of bypassing an error checked slave according to an embodiment of the present disclosure.

It is assumed and described with reference to FIG. 6 that an error occurs in the third slave 300_3.

The master 200 may check that an error occurs in the third slave 300_3 on the basis of a response signal received in correspondence to the transmission of a test control signal. Later, the master 200 may transmit a control signal to the plurality of slaves 300_1 to 300_*n* again. In this case, the master 200 may perform a transmission path so that a control signal is delivered to the nth slave 300_*n* through the first slave 300_1, the second slave 300_2, and the fourth slave (not shown). For this, the master 200 may control operations of the plurality of switch pairs 500_1 to 500_*n*. In more detail, the master 200 may short-circuit the first switch 510_1 and open the second switch 530_1 included in the first switch pair 500_1, short-circuit the third switch 510_2 and open the fourth switch 530_2 included in the second switch pair 500_2, open the fifth switch 510_3 and short-circuit the sixth switch 530_3 included in the third switch pair 500_3, and short-circuit the n−1th switch 510_*n* and open the n−1th switch 510_*n* and open the nth switch 530_*n* included in the nth switch pair 500_*n*. As a result, it has an effect that the master 200 bypasses the error occurred third slave 300_3 through a control of a switching pair.

According to an embodiment of the present invention, by bypassing an error occurred slave, the master 200 allows the remaining slaves having no occurred error to operate normally. Through this, even when an error occurs in one slave, efficient operation is possible without stopping operations of the remaining slaves. Additionally, an occurred error slave may be easily replaced.

Then, a charging control device and an operation method thereof according to another embodiment of the present invention will be described with reference to FIGS. 7 to 9.

Figure 7:
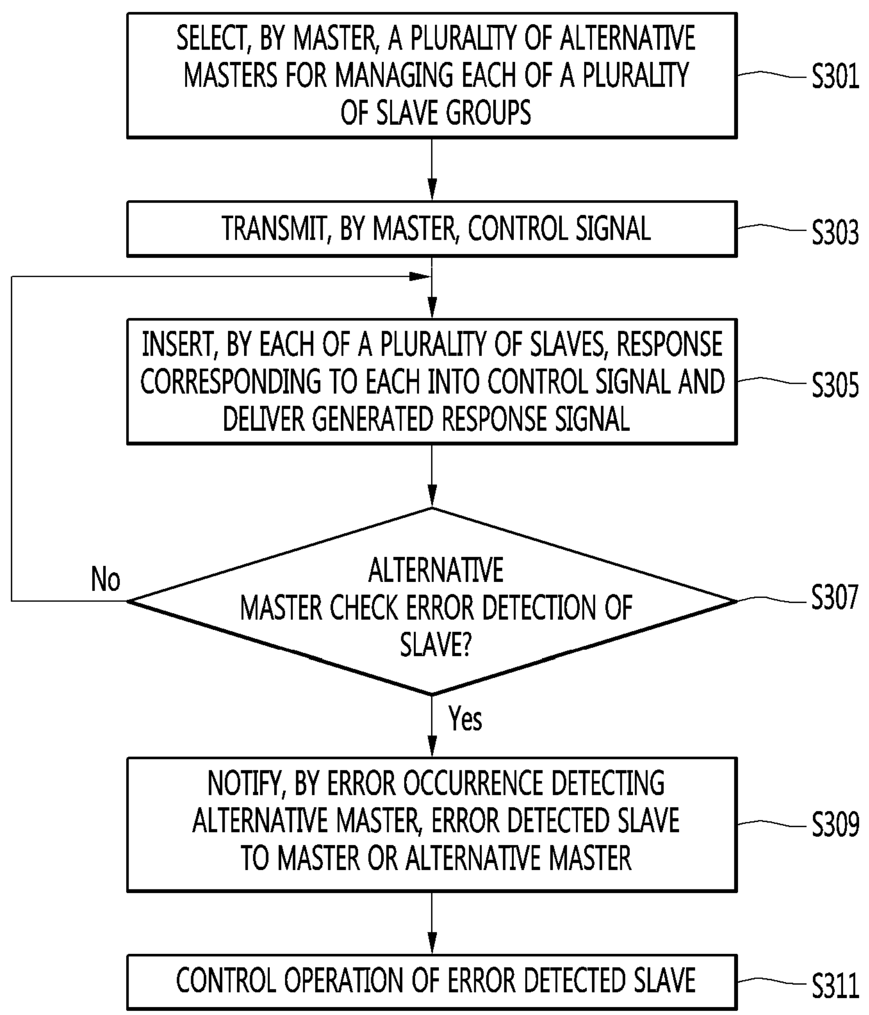
FIG. 7 is a flowchart illustrating an operation method of a charging control device according to another embodiment of the present invention.
Figure 8:
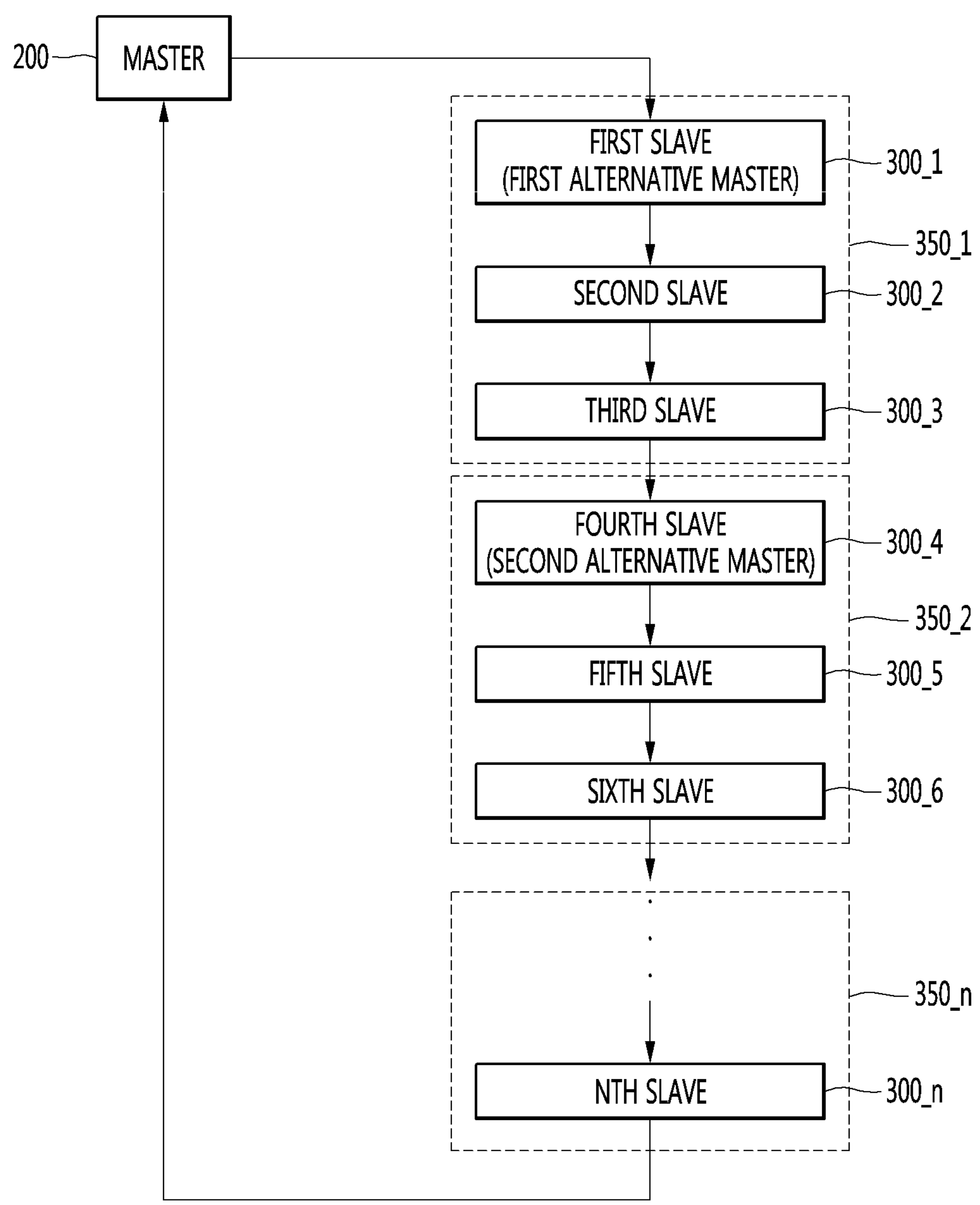
FIG. 8 is a view when an alternative master is selected from each of a plurality of slave groups according to an embodiment of the present invention.
Figure 9:
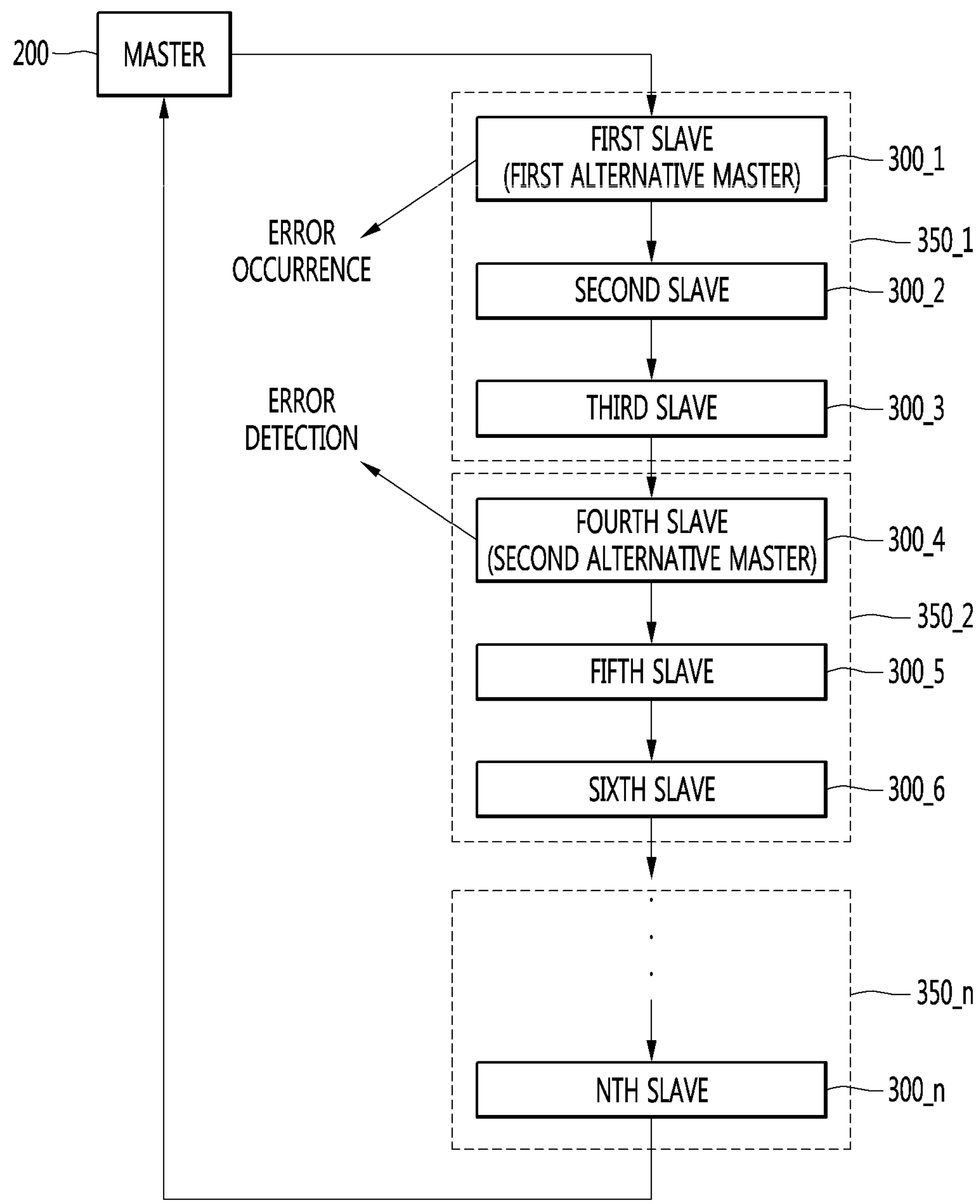
FIGS. 9 and 10 are views illustrating a processing method when an error is detected in an alternative master according to an embodiment of the present invention.

Especially, FIGS. 7 to 9 describe a method of efficiently operating a battery energy storage system as selecting at least one alternative master capable of performing some functions of a master from a plurality of slaves.

FIG. 7 is a flowchart illustrating an operation method of a charging control device according to another embodiment of the present invention.

The master 200 selects a plurality of alternative masters for managing each of a plurality of slave groups in operation 301. According to an embodiment of the present invention, each of a plurality of slave groups may include a plurality of slaves. The master 200 may select an alternative master capable of performing some functions among all functions of the master 200 from a plurality of slaves included in each slave group. The master 200 may control operations of the plurality of slaves. Especially, the master 200 may perform a function for detecting an error of a slave such as overload possibility and short circuit of each slave and a function for transmitting a charging control signal or a discharging control signal to each slave. Additionally, the master 200 may bypass an error occurred slave. The alternative master may perform a function for detecting an error such as overload possibility and short circuit of each slave among functions of the above master 200. According to another embodiment of the present invention, the alternative master may perform all the functions of the master 200.

According to an embodiment of the present invention, each of a plurality of slave groups may include three slaves but this is just exemplary.

It will be described with reference to FIG. 8 that the master 200 selects an alternative master from each of a plurality of slave groups.

FIG. 8 is a view when an alternative master is selected from each of a plurality of slave groups according to an embodiment of the present invention.

A charging control device 111 shown in FIG. 8 may form a ring structure. The ring structure may represent a structure in which the master 200 and the plurality of slaves 300_1 to 300_*n* are connected in series through a communication line. When the charging control device 111 forms a ring structure, since the master 200 and the plurality of slaves 300_1 to 300_*n* are connected in series to each other, the length of a communication wire may be reduced and operational stability may be enhanced. Description for this is identical to that of FIG. 2. Additionally, description for the charging control device 111 shown in FIG. 8 may be included in the content described with reference to FIG. 3.

Referring to FIG. 8, the charging control device 111 includes a master 200 and a plurality of slaves groups 350_1 to 350_*n*. Each of the plurality of slave groups 350_1 to 350_*n* may include a plurality of slaves. For example, the first slave group 350_1 may include a first slave 300_1, a second slave 300_2, and a third slave 300_3, and the second slave group 350_2 may include a fourth slave 400_4, a fifth slave 300_5, and a sixth slave 300_6.

The master 200 may select the first slave 300_1 as a first alternative master from slaves included in the first slave group 350_1 and may select the fourth slave 300_4 as a second alternative master from slaves included in the second slave group 350_2. Each alternative master may detect an error such as an overload state and short circuit of slaves included in a group belonging to itself. An alternative master may notify information on an error detected slave to another alternative master or the master 200.

Again, FIG. 7 is described.

The master 200 transmits a control signal to the first slave 300_1 after selecting a plurality of alternative masters in operation S303. According to an embodiment of the present invention, a control signal may be a signal for detecting whether overload or short circuit occurs in each slave.

According to an embodiment of the present invention, the master 200 may transmit a control signal to the plurality of slaves 300_1 to 300_*n* by using a time synchronization method in order to synchronize the plurality of slaves 300_1 to 300_*n*. For this, the master 200 may transmit a control signal including a data frame to a slave as shown in FIG. 5. Description for a data frame configuring a control signal is identical to that of FIG. 5.

Each of the plurality of slaves generates a response signal by inserting its state information into a delivered test control signal and delivers the generated response signal to the next slave in operation S305.

That is, the first slave 300_1 may generate a response signal by inserting response data representing state information of the first slave 300_1 into a test control signal received from the master 200. The second slave 300_2 may generate a response signal by inserting response data representing state information of the second slave 300_2 into a response signal received from the first slave 300_1. By repeating this process, the nth slave 300_*n* may generate a response signal by inserting response data representing state information of the nth slave 300_*n* and then, deliver the response signal to the master 300. That is, in the data frame structure shown in FIG. 5, each slave may generate a response signal by including response data representing its state information in each slave. In this case, a data frame may not include CRC data.

State information of a slave may include a value of a current flowing in a slave or a voltage applied to a slave. An alternative master may check whether overload is applied to a slave on the basis of the state information of the slave. An alternative master may check whether a short circuit occurs between slaves on the basis of the state information of the slave.

Each alternative master checks whether there is an error detected slave during a process of delivering a response signal in operation S307 and if there is an error detected slave, a corresponding alternative master notifies the master 200 or another alternative master that there is an error detected slave in operation S309.

According to an embodiment of the present invention, an alternative master may detect an error of a slave on the basis of a data frame configuring a response signal. For example, the second alternative master 300_4 shown in FIG. 8 may check whether an error is detected from the first slave group 350_1 on the basis of a data frame configuring a response signal received from the third slave 300_3. In more detail, when a current value of the third slave 300_3 included in a data frame configuring a response signal is greater than a predetermined current value, the second alternative master 300_4 may check whether overload occurs in the third slave 300_3. The second alternative master 300_4 may notify the first alternative master 300_1 or the master 200 that overload occurs in the third slave 300_3.

The second alternative master 300_4 may include, in a response signal, error detection information representing that overload occurs in the third slave 300_3 and deliver the response signal to the next slave. Through this process, the response signal including error detection information may be delivered to the master 200. The master 200 may know quickly that overload occurs in the third slave 300_3 without an additional analysis of a data frame configuring a response signal.

The second alternative master 300_4 may transmit, to the first alternative master 300_1, error detection information representing that overload occurs in the third slave 300_3 wirelessly. In this case, it is assumed that communication is possible wirelessly between each alternative master. The first alternative master 300_1 may check that overload occurs in the third slave 300_3 managed by itself on the basis of error detection information received from the second alternative master 300_4.

The master 200 or an alternative master that detects an error controls an operation of an error detected slave in operation S311.

A process for controlling an operation of an error detected slave on the basis of operation S309 is described.

If the second alternative master 300_4 notifies the master 200 that overload occurs in the third slave 300_3, the master 200 may bypass the third salve 300_3. In this case, as shown in FIG. 3, the charging control device 111 may include a plurality of switching pairs. The master 200 may bypass the third slave 300_3 as controlling operations of a plurality of switch pairs. Since the bypass processing process is described with reference to FIG. 6, detailed description is omitted. Additionally, the master 200 may control operations of the third slave 300_3 through the first alternative master 300_1. That is, the master 200 may transmit an operation stop control signal for stopping an operation of the third slave 300_3 to the first alternative master 300_1 and the first alternative master 300_3 may stop an operation of the third slave 300_3 on the basis of the received operation stop control signal.

If the second alternative master 300_4 notifies the first alternative master 300_1 through wireless communication that overload occurs in the third slave 300_3, the first alternative master 300_1 may bypass the third salve 300_3 without receiving an additional control signal from the master 200. Additionally, without receiving an additional control signal from the master 200, the second alternative master 300_4 may transmit, to the third salve 300_3, an operation stop control signal for stopping an operation of the third slave 300_3 through the second slave 300_2.

Moreover, an error may occur in a slave selected as an alternative master. If an error is detected in an alternative master, an error detected alternative master may be managed by another alternative master. This will be described with reference to FIGS. 9 and 10.

Figure 10:
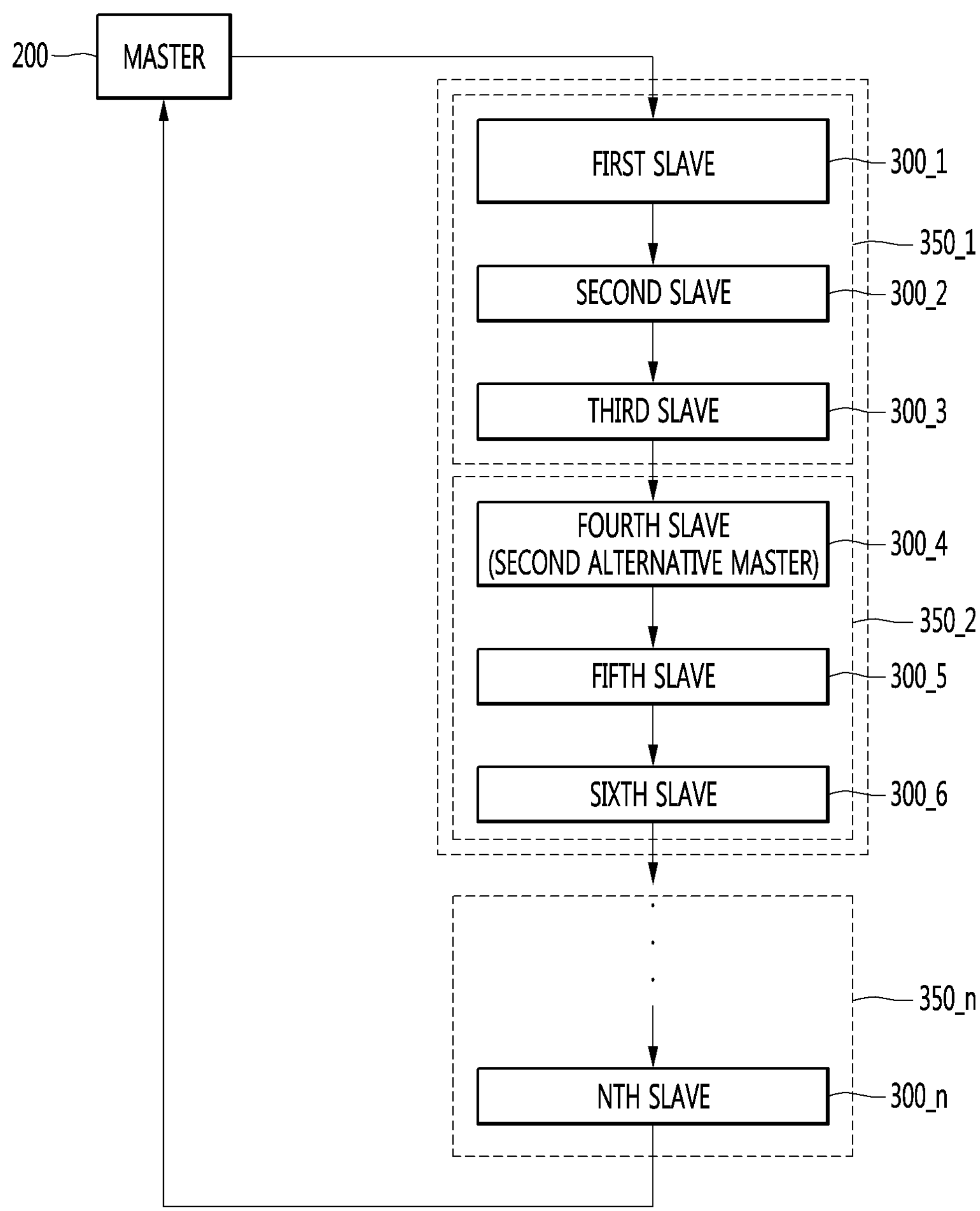

FIGS. 9 and 10 are views illustrating a processing method when an error is detected in an alternative master according to an embodiment of the present invention.

It is assumed and described with reference to FIGS. 9 and 10 that overload occurs in the first alternative master 350_1 so that an error is detected.

The second alternative master 300_4 may check that overload occurs in the first alternative master 300_1 managing the first slave group 350_1 on the basis of a response signal received from the third slave 300_3. That is, when a value of a current flowing in the first alternative master 300_1 is greater than a predetermined current value on the basis of a data frame configuring a response signal, the second alternative master 300_4 may confirm that overload occurs in the first alternative master 300_1. The second alternative master 300_4 may notify the master 200 that overload occurs in the first alternative master 300_1 through the delivery of a response signal. The master 200 may eliminate the qualification of an alternative master assigned to the first slave 300_1 and select the second alternative master 300_4 as an alternative master of the first slave group 350_1. Accordingly, as shown in FIG. 10, the second alternative master 300_4 may manage the first salve group 350_1 and the second slave group 350_2.

According to various embodiments of the present invention, by selecting some of a plurality of slaves as an alternative master capable of performing a master function, a charging control device may be managed efficiently.

Especially, according to various embodiments of the present invention, as an error occurred slave is detected fast, it is possible to quickly perform the countermeasure for it.

According to an embodiment of the present invention, by bypassing an error occurred slave, it is possible to allow the remaining slaves having no occurred error to operate normally. Through this, even when an error occurs in one slave, efficient operation is possible without stopping operations of the remaining slaves. Additionally, an occurred error slave may be easily replaced.

According to various embodiments of the present invention, by selecting some of a plurality of slaves as an alternative master capable of performing a master function, a charging control device may be managed efficiently.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A charging control device comprising:

one or more slave groups including a plurality of slaves for charging or discharging a battery; and a master configured to transmit, to the one or more slave groups, a control signal for controlling operations of the one or more slave groups, and select one of a plurality of slaves included in each of the one or more slave groups as an alternative master, wherein the alternative master is a slave capable of performing at least some functions of the master, the at least some functions comprising a function for detecting whether an overload of a slave occurs, and wherein, when an alternative master among a plurality of alternative masters detects an overload of a slave included in another slave group, the alternative master detecting the overload of the slave transmits information on the overload occurring slave to another alternative master or the master.

2. The charging control device of claim 1, further comprising a plurality of switch pairs for connecting or separating between the plurality of slaves, wherein the master controls operations of the plurality of switch pairs to bypass an overload occurring slave on the basis of received information.

3. The charging control device of claim 2, wherein the bypassing processing is a process for controlling operations of the plurality of switch pairs to deliver the control signal between the remaining slaves except for the error occurring slave.

4. The charging control device of claim 1, wherein the master transmits a control signal to check an error occurring slave among the plurality of slaves and the alternative master checks an error occurring slave on the basis of a response signal corresponding to the control signal.

5. The charging control device of claim 4, wherein the response signal comprises a data frame including response data representing state information of each of a plurality of slaves.

6. The charging control device of claim 5, wherein the state information comprises at least one of values of current and voltage flowing in each slave.

7. The charging control device of claim 6, wherein, when a value of a current flowing in a slave is greater than a predetermined value, the alternative master determines this as that an overload is applied to a corresponding slave.

8. The charging control device of claim 1, wherein the plurality of slaves and the master are connected in series to each other to have a ring structure.

* * * * *